United States Patent [19]

Kawamura

[11] Patent Number: 5,005,552

[45] Date of Patent: Apr. 9, 1991

[54] EXHAUST GAS RECIRCULATION SYSTEM OF ENGINE

[75] Inventor: Hideo Kawamura, Samukawa, Japan

[73] Assignee: Isuzu Motors Limited, Tokyo, Japan

[21] Appl. No.: 514,456

[22] Filed: Apr. 25, 1990

[30] Foreign Application Priority Data

May 9, 1989 [JP] Japan .................................. 1-114140

[51] Int. Cl.$^5$ ............................................ F02M 25/07
[52] U.S. Cl. .................................. 123/571; 123/90.11; 123/90.15
[58] Field of Search ............... 123/90.11, 90.15, 90.16, 123/568, 569, 571

[56] References Cited

U.S. PATENT DOCUMENTS

| | | | |
|---|---|---|---|
| 4,357,917 | 11/1982 | Aoyama | 123/568 X |
| 4,700,684 | 10/1987 | Pischinger et al. | 123/568 |
| 4,722,315 | 2/1988 | Pickel | 123/90.11 X |
| 4,938,179 | 7/1990 | Kawamura | 123/90.11 |

FOREIGN PATENT DOCUMENTS

| | | |
|---|---|---|
| 0219202 | 4/1987 | European Pat. Off. . |
| 51-34526 | 9/1976 | Japan . |
| 0162312 | 9/1984 | Japan . |
| 62-51747 | 3/1987 | Japan . |
| 2134596 | 8/1984 | United Kingdom . |
| 2165587 | 4/1986 | United Kingdom . |

OTHER PUBLICATIONS

Patent Abstracts of Japan. vol. 6, No. 253 JP-A-5-7-148048 (Nippon), 13 Sep. 1982.

*Primary Examiner*—Willis R. Wolfe
*Attorney, Agent, or Firm*—Browdy and Neimark

[57] ABSTRACT

In this exhaust gas recirculation system of an engine, each of the intake and exhaust valves is actuated for opening and closing by electromagnetic force of an electromagnetic valve driving device, an intake flow rate when exhaust gas recirculation is made and an intake flow rate when exhaust gas recirculation is stopped are detected by detection means for detecting the intake flow rates and a controller compares these detection signals to detect the exhaust gas recirculation flow rate. The controller regulates the exhaust valve for exhaust gas recirculation in response to the comparison result between an optimum exhaust gas recirculation flow rate and the exhaust gas recirculation flow rate corresponding to the detection signals of the detection means, respectively, so that the exhuast gas flow rate becomes the optimum flow rate.

10 Claims, 4 Drawing Sheets

EXHAUST GAS RECIRCULATION SYSTEM OF ENGINE

BACKGROUND OF THE INVENTION

1. Field of the Invention

This invention relates to an exhaust gas recirculation system of an engine which controls intake and exhaust valves for opening and closing by electromagnetic force.

2. Description of the Prior Art

A conventional electronic control engine for controlling intake and exhaust valves in accordance with the operational conditions of an engine is disclosed, for example, in Japanese Patent Laid-Open No. 162312/1984. This electronic control engine controls the intake and exhaust valves of the engine for opening and closing by electromagnetic force, and includes means for inputting the operational conditions of the engine and the atmospheric conditions, sampling data per predetermined crank angle and determining opening/closing timings of the intake and exhaust valves, their lift characteristics, the ON/OFF time ratio and the injection quantity of an injector, means for outputting driving signals per predetermined crank angle to solenoids of the intake and exhaust valves and means for outputting the driving signals to the injection when the exhaust valves are open.

Generally, an exhaust gas recirculation system of an engine limits the occurence of NOx by mixing part of the exhaust gas with the intake air and the exhaust gas recirculation ratio is expressed by a mass ratio of the exhaust gas quantity to the total gas quantity sucked in exhaust gas recirculation. In other words, the exhaust gas recirculation ratio $r_{EGR}$ can be expressed as follows with $m_{EGR}$ and $m_{IN}$ being the recirculated exhaust gas quantity and the intake air-fuel quantity, respectively:

$$r_{EGR} = m_{EGR}/(m_{EGR} + m_{IN})$$

In the exhaust gas recirculation system of an engine, however, it is difficult to detect the exhaust gas recirculation flow rate passing into a combustion chamber when exhaust gas recirculation is effected by the valve motion of the valves. Since the exhaust gas recirculation flow rate cannot be known, the exhaust gas recirculation flow rate to be introduced into the combustion chamber cannot be regulated. Therefore, when exhaust gas recirculation is executed by the valve motion of the exhaust valves, there remains the problem how the exaust gas recirculation flow rate can be detected and how the valve lift quantity and valve opening time of the exhaust valve can thereby be regulated in order to determine the optimum exhaust gas recirculation flow rate for the load and number of revolution of the engine and to bring the exhaust gas recirculation flow rate close to the optimum exhaust gas recirculation flow rate in response to the exhaust gas recirculation flow rate thus detected.

An example of the prior art exhaust gas recirculation controllers is described in Japanese Patent Laid-Open No. 51747/1987, for example. This exhaust gas recirculation controller includes a reflux pipe for refluxing the exhaust gas of an internal combustion engine to an intake pipe, opening/closing means for opening and closing the reflux pipe, control means for controlling the opening/closing means for opening and closing, intake air detection means for detecting the intake air quantity to the intake pipe, memory means for storing separately the detected values from the detection means when the opening/closing means is opened and closed by the control means, judgement means for judging whether or not the difference between the detected values is within a predetermined range, upon receiving the detected values from the memory means, and alarm means for raising an alarm when the difference is judged to be within the predetermined range by the judgement means. This exhaust gas reflux controller or the gas recirculation apparatus includes the reflux pipe for refluxing the exhaust gas to the intake pipe and the opening/closing means for opening and closing the reflux pipe, and the exhaust gas is subjected to exhaust gas recirculation through the intake pipe and the intake valve. Therefore, contamination of the intake system by the exhaust gas is remarkable and there remain the problems that adjustment of the exhaust gas recirculation flow rate cannot be made and a large quantity of exhaust gas cannot be recirculated.

The exhaust gas recirculation apparatus of an internal combustion engine is disclosed in Japanes Patent Publication No. 34526/1976, for example. In a four-cycle internal combustion engine of the type wherein the exhaust valve of the same cylinder is opened for a short period immediately before or after the end of the intake stroke and part of the exhaust gas in the exhaust pipe is sucked into the cylinder during the intake stroke, the exhaust gas recirculation apparatus of this prior art reference connects the exhaust pipe of a certain cylinder whose intake valve is in the closing period to the exhaust pipe of a cylinder whose exhaust valve is in the opening period and disposes a valve which cuts off the communication between both exhaust pipes with an exhaust aggregate pipe when the exhaust valves are open for the short period described above, at the junction of each exhaust pipe with the exhaust aggregate pipe.

This exhaust gas recirculation apparatus disposes further a valve which cuts off the communication between each exhaust pipe and the exhaust aggregate pipe when each exhaust pipe is open for the short period described above, at the junction between each exhaust pipe and the exhaust aggregate pipe. The opening and closing operation of each exhaust valve for the purpose of exhaust gas recirculation, that is, the valve motion mechanism, is effected by a cam rope disposed at a cam. Accordingly, once the shape of the cam is determined and the cam is produced, the valve lift quantity and valve timing of the exhaust valve are determined so that the exhaust gas recirculation flow rate cannot be adjusted. Accordingly, it is not possible to adjust the exhaust gas recirculation flow rate in accordance with the operational conditions of the engine such as the change of the atmospheric pressure, the change of the number of revolution of the engine, the temperature change, the change of the engine load, and so forth.

SUMMARY OF THE INVENTION

In order to solve the problems described above, the present invention is based on the technical conception that the operation of both intake and exhaust valves can be controlled independently of the rotation of a crank shaft by producing these valves by a lightweight material such as a ceramic material, actuating these valves for opening and closing by electromagnetic force and controlling their operational conditions such as opening and closing timings, valve lift quantities, and the like, and that no problem at all occurs when a flow rate sensor for detecting the intake air flow rate is disposed in an intake system in comparison with the case where the sensor is disposed in an exhaust system. In other words, the present invention is directed to provide an exhaust gas recirculation apparatus of an engine which conducts mutually different operations, that is, the operation for effecting exhaust gas recirculation (abbreviated to "EGR") by causing backflow of an exhaust gas or causing the exhaust gas to stay by opening the exhaust valve, and an operation which does not effect exhaust gas recirculation, detects each intake flow rate by each flow rate sensor disposed in the intake system under each of these operational conditions, and measures accurately and rapidly the exhaust gas recirculation flow rate from the difference of both detected intake flow rates.

It is another object of the present invention to provide an exhaust gas recirculation apparatus of an engine which comprises intake and exhaust valves actuated for opening and closing electromagnetic force; electromagnetic valve driving devices each for actuating each valve for opening and closing by electromagnetic force; detection means for detecting intake flow rate; and a controller for detecting the intake flow rate under the state where exhaust gas recirculation is effected and the intake flow rate under the state where it is not effected, by the detection means, comparing the detection signals and detecting the exhaust gas recirculation flow rate; and which can detect accurately and reliably the exhaust gas recirculation flow rate between cycles of a short period without being affected by the engine load and number of revolution of the engine which change constantly.

It is still another object of the present invention to provide an exhaust gas recirculation apparatus of an engine which detects an exhaust gas recirculation flow rate by effecting exhaust gas recirculation for a predetermined cylinder to obtain a detection signal detecting the intake flow rate of this cylinder, stopping the cycle of exhaust gas recirculation for this cylinder to obtain a detection signal detecting the intake flow rate of this cylinder, and comparing both detection signals thus detected in order to detect the exhaust gas recirculation flow rate. In other words, this exhaust gas recirculation apparatus stops the cycle of exhaust gas recirculation for only one cycle under a certain operational condition of the engine so as to detect the intake flow rate, executes again exhaust gas recirculation in the next cycle so as to detect the intake flow rate and can thus detect accurately and reliably the exhaust gas recirculation flow rate without being affected by the engine load and number of revolution of the engine that change incessantly.

It is still another object of the present invention to provide an exhaust gas recirculation apparatus of an engine which effects exhaust gas recirculation for a predetermined cylinder of a multiple cylinder engine so as to obtain a detection signal detecting the intake flow rate of this cylinder, stops exhaust gas recirculation for other cylinders so as to obtain detection signals detecting the intake flow rates of the cylinders, compares these detection signals and detects the exhaust gas recirculation flow rate. Therefore, this exhaust gas recirculation apparatus can select arbitrarily and freely the exhaust valves for which recirculation of exhaust gas is to be executed and stopped, can detect their detection signals and can obtain more accurate detection values by employing the mean value of the resulting detection values.

Accordingly, the exhaust gas recirculation flow rate can be detected immediately, accurately and reliably at all times in response to the change of the engine load and number of revolution and further, in accordance with various conditions such as the change of the atmospheric pressure and the temperature change. Further, since the exhaust valves are actuated by the electromagnetic force, the exhaust gas is recirculated into the combustion chambers through the exhaust valves and since the exhaust gas is not at all passed through the intake system, large and optimum quantities of exhaust gas can be recirculated. Since the exhaust gas does not flow through the intake system, it does not contaminate the intake system.

It is still another object of the present invention to provide an exhaust gas recirculation apparatus of an engine which regulates the exhaust valve such as the valve lift quantity, valve timing, etc, and the exhaust gas recirculation operational conditions at the time of opening and closing of the exhaust valves in order to supply the optimum exhaust gas recirculation flow rate in accordance with the engine operational conditions such as the change of the atmospheric pressure, the change of the number of revolution of the engine, the temperature change, the engine load change, and the like, on the basis of the measurement result of the exhaust gas recirculation flow rate described above.

It is a further object of the present invention to provide an exhaust gas recirculation apparatus of an engine which comprises electromagnetic valve driving devices for actuating the intake and exhaust valves for opening and closing by electromagnetic force; first detection means for detecting the operational conditions of the engine; second detection means for detecting the exhaust gas recirculation flow rate; and a controller for adjusting the exhaust gas recirculation operational conditions of the exhaust valves in response to the result of comparison of an electrical signal of the optimum exhaust gas recirculation flow rate corresponding to the detection signal of the first detection means and an electrical signal of the exhaust gas recirculation flow rate detected by the second detection means.

In this exhaust gas recirculation apparatus, therefore, the electromagnetic valve driving device controls each exhaust valve for opening and closing in response to the measurement result of the exhaust gas recirculation flow rate so as to regulate the valve lift quantity, the valve opening time, the valve timing and the exhaust gas recirculation operational conditions at the time of opening and closing of the exhaust valve, and the apparatus can therefore supply the optimum exhaust gas recirculation flow rate in accordance with the operational conditions of the engine such as the change of the atmospheric pressure, the change of the number of revolution of the engine, the temperature change, the change of the engine load, and so forth, In other words, since the exhaust gas recirculation flow rate can be detected by the valve operation of the exhaust valve when exhaust gas recirculation is made, the apparatus can determine the optimum exhaust gas recirculation flow rate in accordance with the load and number of revolution of the engine, and can regulate easily and accurately the exhaust valve by generating the instruction from the controller to the electromagnetic valve driving device to adjust its valve lift quantity and valve opening time so as to bring the exhaust gas recirculation flow rate close to the optimum exhaust gas recirculation flow rate in response to the detected exhaust gas recirculation flow rate.

As to each detection means for detecting the operational conditions of the engine, the intake flow rate passing through each intake port, for example, can be detected by an intake flow rate sensor which detects the air flow impinging against a heating wire by the change of the resistance value of the heating wire, and by inputting the electrical signal from this intake flow rate sensor to an intake flow rate processor. The number of revolution of the engine can be detected by a rotation sensor disposed on the engine, and the engine load can be detected by detecting the fuel supply quantity to a fuel load device or a step-in quantity of an acceleration pedal to obtain the respective detection signal. The stroke position of the piston can be detected by a position sensor which detects a crank angle.

DETAILED DESCRIPTION OF THE EMBODIMENT

Hereinafter, an embodiment of the exhaust gas recirculation apparatus of an engine in accordance with the present invention will be described with reference to the accompanying drawings.

Figure 1:
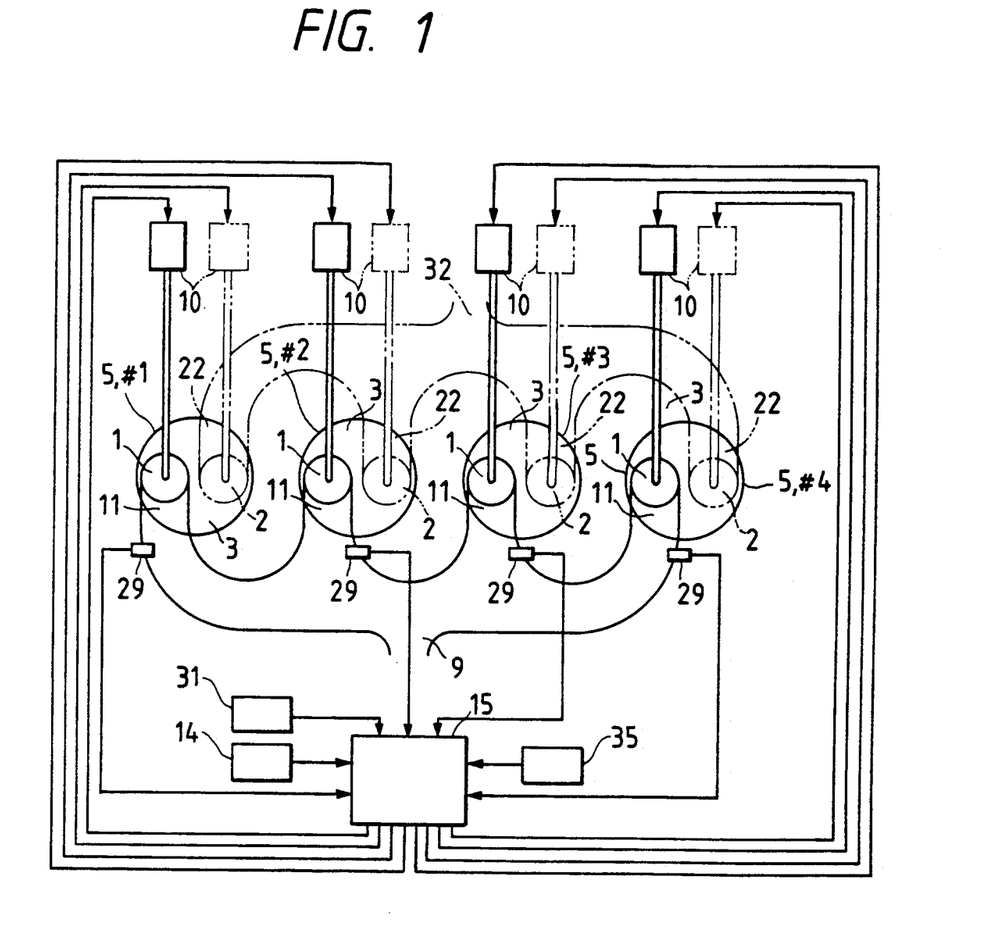
FIG. 1 is a schematic explanatory view of a multiple cylinder engine which is useful for explaining an exhaust gas recirculation apparatus in accordance with the present invention.

FIG. 1 is a schematic explanatory view of a multiple cylinder engine and is useful for explaining an exhaust gas recycling apparatus of an engine in accordance with the present invention.

FIG. 1 shows a four-cylinder engine as an example of the multiple cylinder engine. An intake port 11 and an exhaust port 22 are formed in a cylinder head 3 of each of the four cylinders 5, and an intake valve 1 and an exhaust valve 2 are disposed in the intake port 11 and in the exhaust port 22, respectively. Each of the intake and exhaust valves 1, 2 is actuated for opening and closing by electromagnetic force of a valve lifter 10 of an electromagnetic valve driving device in accordance with an instruction from a later-appearing controller 15. An intake pipe forming the intake port 11 of each cylinder 5 branches from an intake aggregate pipe 9. An exhaust pipe forming the exhaust port 22 of each cylinder 5 is connected to an exhaust aggregate pipe 32. An intake flow rate sensor 29 is disposed at the intake port 11 of each cylinder 5 and detects the flow rate of the intake air flowing through each intake port 11. The detection signal by the intake flow rate sensor 29 is inputted to the controller 15.

Figure 2:
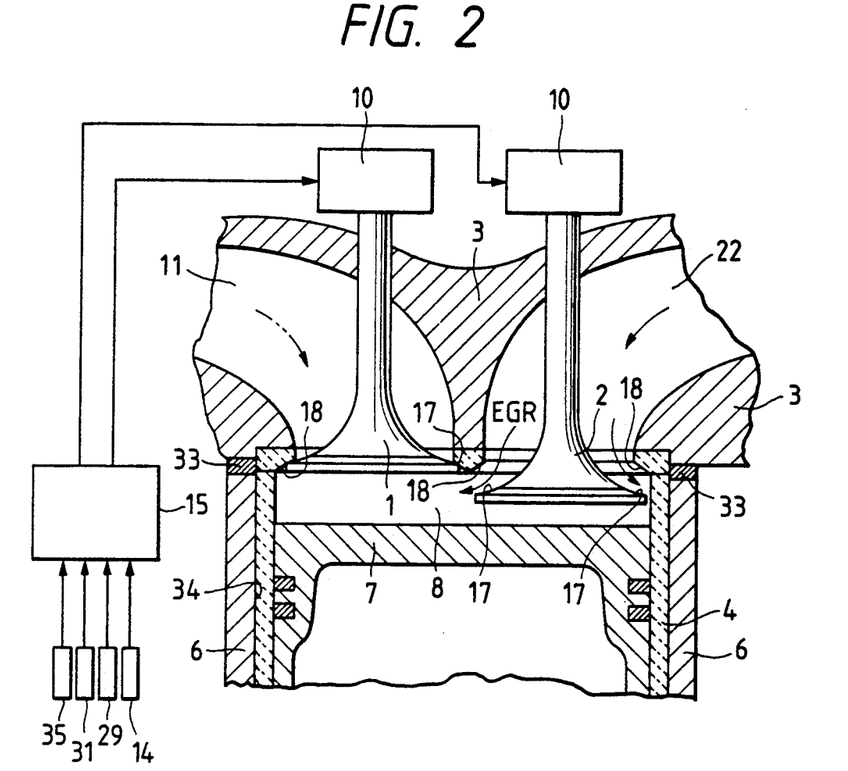
FIG. 2 is a schematic explanatory view useful for explaining an engine equipped with an electromagnetic valve driving device when one of the cylinders shown in FIG. 1 is taken out.

FIG. 2 is an explanatory view showing an engine equipped with the electromagnetic valve driving device when one of the cylinders 5 shown in FIG. 1 is taken out. In FIG. 2, the cylinder liner 4 is fitted into a hole 34 bored in the cylinder block 6 constituting the engine and forms each cylinder 5. The cylinder head 3 is fixed to the upper surface of this cylinder block 6 through a gasket 33. A piston 7 is adapted to reciprocate inside the cylinder liner 4. A combustion chamber 8 is the chamber which is encompassed and defined by the cylinder liner 4, the cylinder head 3 and the piston 7. The intake port 11 and the exhaust port 22 are formed in the cylinder head 3 and valve seats 18 are disposed at these ports. The intake valve 1 which is actuated for opening and closing by the electromagnetic force is disposed on the valve seat 18 of the intake port 11 and the exhaust valve 2 actuated for opening and closing by the electromagnetic force is disposed on the valve seat 18 of the exhaust port 22.

In the engine equipped with the electromagnetic valve driving device, each of the intake and exhaust valves 1, 2 is actuated for opening and closing by the electromagnetic force of each valve lifter 10 of the electromagnetic valve driving device. The valve lifter 10 of the electromagnetic valve driving device is controlled by the controller 15 which receives detection signals from later-appearing rotation sensor 14 for detecting the number of revolution of the engine, load sensor 31 for detecting an engine load, position sensor 35 for detecting the stroke position of the piston or a crank angle and intake air flow rate sensor 29 for detecting the intake air quantity and generates an instruction in response to each of these detection signals. The electromagnetic valve driving device can drive the valves in the following way. Namely, the controller 15 receives each of the detection signals detected by the rotation sensor 14, intake air flow rate sensor 29, load sensor 31 and position sensor 35 and passes a current through stationary element coil 20 and movable element coil 24 of the valve lifter 10 of the electromagnetic valve driving device in response to the detected load signal so that the electromagnetic is excited and the valve can be driven. The detail of each of these sensors will be described later with reference to FIG. 3.

Next, an example of the electromagnetic valve driving device capable of actuating the intake valve 1 and the exhaust valve 2 for opening and closing in the exhaust gas recycling apparatus of an engine in accordance with the present invention will be explained with reference to FIG. 3.

Figure 3:
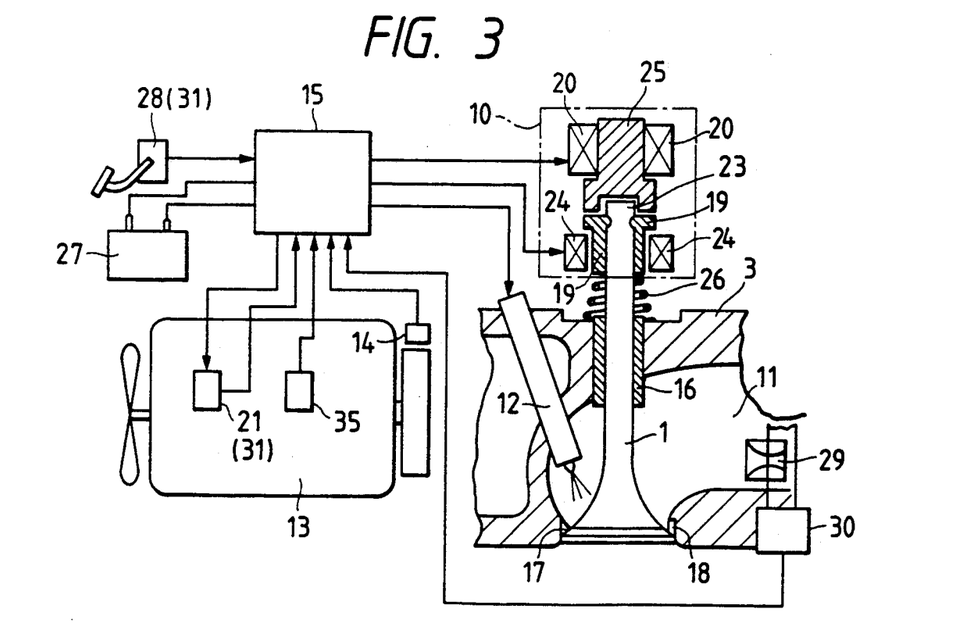
FIG. 3 is an explanatory view showing an example of the electromagnetic valve driving device to be assembled in the present invention.

As shown in FIG. 3, this electromagnetic valve driving device is assembled in the engine 13 and the drawing shows conceptually the principal portions of the electromagnetic valve driving device when taken out from the engine 13. A fuel injection device 21 for controlling the supply fuel to the engine 13 has an injection nozzle 12 and this injection nozzle 12 is inserted from the upper part of the cylinder head 3 into the intake port 11 so that the fuel injected from a nozzle hole is atomized and introduced into the cylinder. This fuel injection device 21 is controlled by the instruction from the controller 15 so as to inject a predetermined quantity of fuel. The engine rotation sensor 14 is disposed on the output shaft of the engine 13 to detect the number of revolution of the engine. The detection value of the number of revolution of the engine, that is, the rotation signal, is inputted to the controller 15. The intake valve 1 is made of a ceramic material and is disposed slidably in the vertical direction while being guided by a valve guide 16 which is fixed to the cylinder head 3. Though the drawing shows only the intake valve 1, the electromagnetic valve driving device likewise drives electromagnetically the exhaust valve 2, too.

As the intake valve 1 moves up and down, the valve face 17 of the intake valve 1 comes into contact with and separates from the valve seat 18 disposed on each intake port 11 of the cylinder head 18, and the intake port 11 is opened and closed. Accordingly, the intake air quantity into each cylinder of the engine 13 is controlled by the opening and closing operation or the opening and closing quantity of each intake port 11. A movable element 19 made of a magnetic material such as soft iron is fixed to the upper end 23 of the intake valve 1 and a movable element coil 24 is disposed on the movable element 19. A stationary element made of a magnetic material such as soft iron is disposed in the cylinder head 3 above the movable element 19 so as to face the same, and a stationary element coil 20 is disposed on the stationary element 25. Therefore, when the current is supplied to and cut off from the movable element coil 24 and stationary element coil 20, the stationary element 25 attracts/separates the movable element 19 and the intake valve 1 is actuated to move up and down.

In the drawing, a valve spring 26 is shown disposed between the valve spring seat which is formed on the upper surface of the cylinder head 3 and the movable element 19. Though the detailed disposition structure of the valve spring 26 is not shown, this valve spring 26 may be either a tensile spring or a compression spring and its spring force has a righting action acting in the opposite direction to the electromagnetic force. Therefore, if the intake and exhaust valves 1 and 2 are opened by the electromagnetic forces of the respective valve lifters 10, they are closed by the spring force of the valve spring 26.

Further, as to the intake/exhaust valves 1, 2 which are actuated by the electromagnetic force, the material forming the intake/exhaust valves 1, 2 themselves is preferably a ceramic material to reduce the weight and is preferably a non-magnetic material in order to prevent attraction of iron powder or the like to the valve face 17 of the intake/exhaust valves 1, 2 and to the sliding portion of the valve stem. If iron powder or the like is attracted to the valve face 17 and to the sliding portion of the valve stem, the tight close state of the intake/exhaust ports by the intake/exhaust valves 1, 2 gets deteriorated and since frictional resistance of the sliding portion becomes great, undesirable conditions such as seizure will occur. Therefore, in order to actuate the intake/exhaust valves 1, 2 by the electromagnetic force, the movable element 19 made of the magnetic material is separately disposed at the upper end portion of the intake/exhaust valves 1, 2. If the intake/exhaust valves are constituted in the manner described above, the stationary element 25 can separate or attract the movable element 19 against the biasing force of the spring 26 when a controlled current from the controller 15 is supplied or cut off from the movable element coil 24 and the stationary element coil 20, so that the intake valves 1 can move down and up and the valve face 17 of each intake valve 1 can open or close the intake port 11.

In this electromagnetic valve driving device, the controller 15 receives each of the detection signals detected by the load sensor 31, the rotation sensor 14 and the position sensor 4, passes the current to the stationary element coil 20 and to the movable element coil 24 in the valve lifter 10 of the electromagnetic valve driving device in response to the detected load signal and can thus actuate each valve by exciting the electromagnet. The load sensor 31 of the engine 13 is for detecting the engine load and can detect it by detecting the fuel supply quantity supplied from the injection nozzle 12 of the fuel injection device 21 to the engine 13 or by detecting the step-in quantity of an acceleration pedal 28. In other words, the load sensor 31 can be constituted by a detection sensor for the fuel supply quantity to the engine and/or a detection sensor for the step-in quantity of the acceleration pedal 28.

Therefore, the electromagnetic valve of each of the intake/exhaust valves 1, 2 can be controlled by inputting the fuel supply quantity to the engine 13 and/or the step-in quantity signal of the acceleration pedal 28 as the load signal of the engine to the controller 15. The position sensor 31 of the engine 13 is for detecting the stroke position of the piston 7 and can detect the position by detecting a crank angle. The intake air flow rate sensor 29 is disposed in the intake pipe forming each intake port 11. This intake air flow rate sensor 29 detects the air flow impinging against a heating wire through which a current flows, by the change of the resistance value of the heating wire, and the signal from this intake air flow rate sensor 29 is inputted to an intake air flow rate processor 30 and can detect the intake air flow rate flowing through each intake port 11. The intake air flow rate thus detected is inputted to the controller 15.

The controller 15 comprises a microcomputer and is equipped with a central processing unit for executing operational processing, various memories for storing the sequence of the operational processing, control means, etc, and input/output ports. When various signals are inputted from the afore-mentioned various sensors and the intake air flow rate processor 30, the controller 15 executes the processing in accordance with the sequence stored in the memory, generates a control instruction to the electromagnetic coils 20, 24 for the valve mechanism for opening and closing the intake valve 1 and the exhaust valves, and controls the opening and closing operations of these intake/exhaust valves. Besides the opening/closing operation of the intake/exhaust valves, the controller 15 operates a valve opening, a valve lift quantity, a valve timing, a valve opening time, a fuel injection timing, and the likes, and generates the control instruction in accordance with the operation result. Incidentally, reference numeral 27 in the drawing represents a battery, which operates as the power source for the controller 15 and various coils for the valve mechanisms.

Figure 4A:
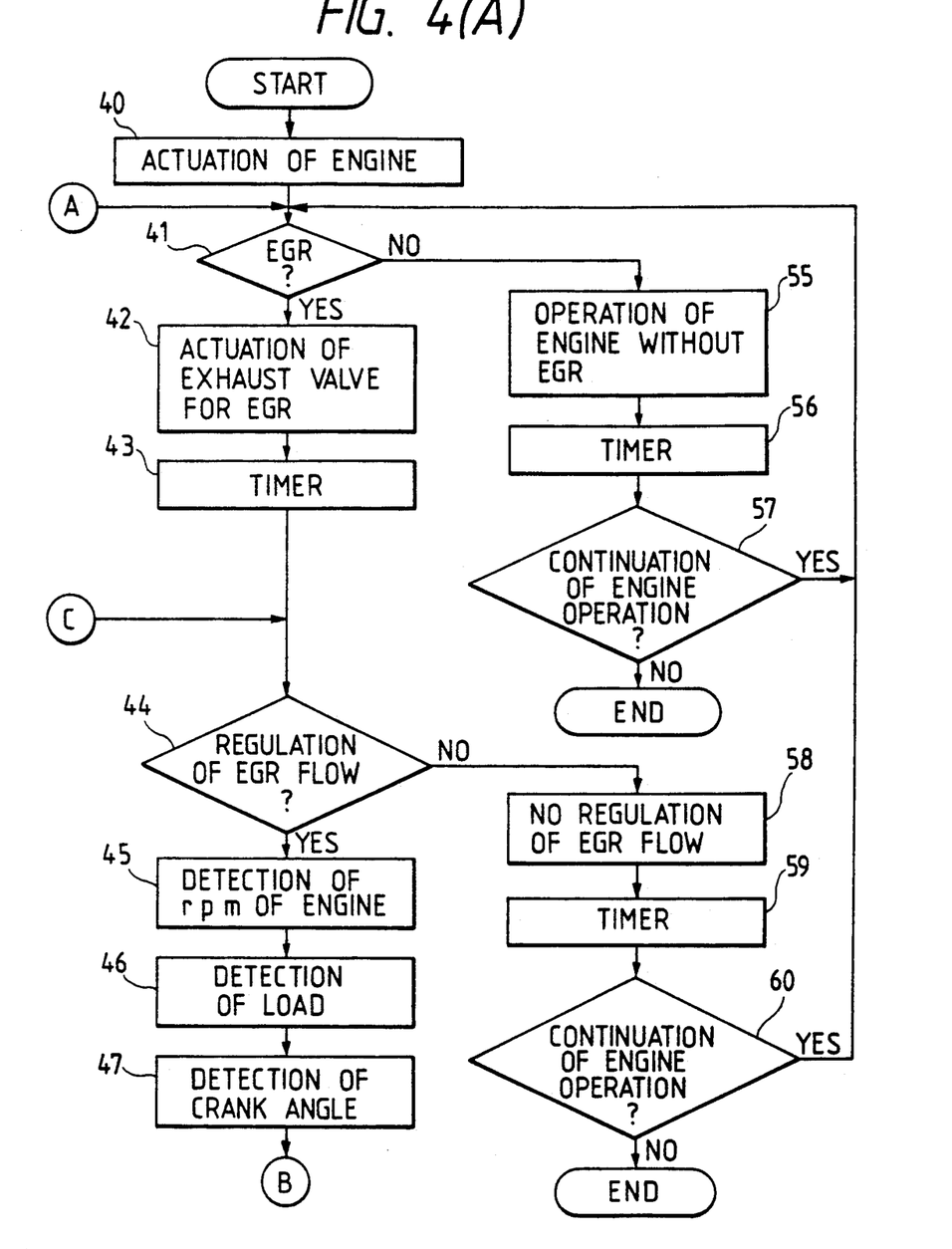
FIG. 4(A) and 4(B) are process flowcharts showing an example of the operations of the exhaust gas recirculation apparatus assembling therein the electromagnetic valve driving device.
Figure 4B:
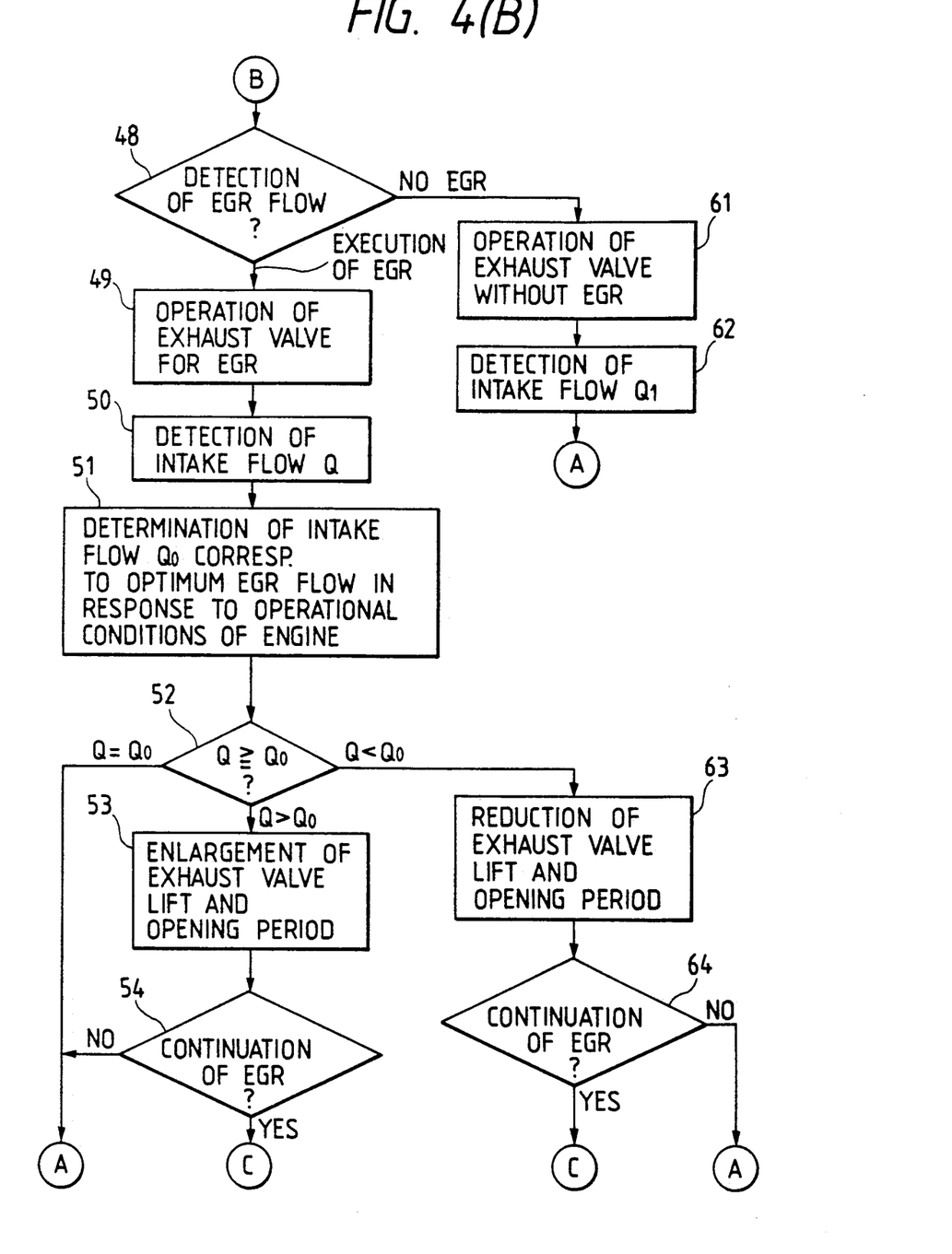

The electromagnetic valve driving device that can be assembled in the exhaust gas recirculation apparatus of an engine in accordance with the present invention has the construction as described above. Next, an embodiment of this exhaust gas recycling apparatus of an engine will be explained with reference to FIGS. 1, 2, 3 and 4. FIGS. 4 (A) and 4 (B) are processing flow-charts showing an example of the operations of the exhaust gas recirculation apparatus that can incorporate the electromagnetic valve driving device.

First, the exhaust gas recirculation apparatus of the present invention can be accomplished in the following way in a multiple cylinder engine equipped with the electromagnetic valve driving device.

The exhaust gas recirculation apparatus of an engine in accordance with the present invention operates in the following way. When the engine 13 is actuated, both the intake and exhaust valves 1 and 2 are actuated for opening and closing operation by the electromagnetic valve driving device (step 40) and while exhaust gas recirculation (hereinafter abbreviated to "EGR") is effected for a predetermined period such as a short period from the point immediately before the end of the intake stroke of the engine cycle to the point immediately after it, the intake air flow rate Q is detected by the flow rate sensor 29 (step 51). The intake flow rate $Q_1$ under the state where this exhaust gas recirculation is stopped is detected (step 62). Both of these detection signals are inputted to, and compared by, the controller 15 in order to detect the flow rate of the exhaust gas recirculation. In other words, since the exhaust gas is recirculated into the combustion chamber 8, the intake flow rate into the combustion chamber 8 drops in the amount corresponding to this EGR flow rate. Accordingly, assuming that the flow rate introduced into the combustion chamber 8 is constant, it can be known that the exhaust gas recirculation flow rate $m_{ECR}$ is the difference between the intake flow rate Q sucked into the combustion chamber 8 when EGR is effected and the intake flow rate $Q_1$ sucked into it when EGR is stopped, as expressed below:

$$m_{EGR} = Q_1 - Q$$

The intake flow rate $Q_1$ sucked into the combustion chamber 8 when EGR is stopped and the intake flow rate Q sucked when EGR is effected during the engine operation can be detected definitely in the following way.

One of such means comprises providing a mode where EGR is stopped for only one cycle (step 61) under certain operational conditions of the engine (step 40), detecting the intake flow rate $Q_1$ by the flow rate sensor 29 disposed at the intake port 11 at that time (step 62), inputting the detection signal (electrical signal) to the controller 15 and storing it in the storage means of the controller 15. Next, the means opens the exhaust valve 2 for a predetermined period in the next cycle to execute EGR (step 50), detects the intake flow rate Q by the flow rate sensor 29 disposed at the intake port 11 at that time (step 46), and then inputs the detection signal or the electrical signal to the controller 15. The comparison means of the controller 15 then compares the the electrical signal corresponding to the intake flow rate $Q_1$ with the electrical signal corresponding to the intake flow rate Q and the calculation means of the controller 15 calculates the difference between them, that is, $Q_1 - Q$, and calculates the flow rate of the exhaust gas recirculation $m_{EGR}$ that is introduced into the combustion chamber 8 by exhaust gas recirculation from this difference value. The accurate value of the exhaust gas recirculation flow rate $m_{EGR}$ can be detected by repetition of such a determination cycle.

Incidentally, since the load and number of revolution of the engine are always changing, it is not preferred to conduct the determination cycle itself for a long period. Therefore, it is preferred to carry out the determination cycles with the difference of one cycle as described above so as to detect the exhaust gas recirculation flow rate.

As another system, the exhaust gas recirculation flow rate can be detected in the following way in the multiple cylinder engine equipped with the electromagnetic valve driving device. In the four-cylinder engine shown in FIG. 1, a mode wherein exhaust gas recirculation is stopped is provided to the cylinders #1 and #2 among the cylinders 5 (step 61) under certain operational conditions of the engine (step 40), the intake flow rate Q is detected by the flow rate sensor 29 disposed at the intake port 11 of each cylinder #1, #2 at this time (step 62) and this detection signal, that is, the electrical signal, is inputted to the controller 15. At the same time, the exhaust valve 2 is opened for a predetermined period of time for each of the cylinders #3 and #4 among the cylinders 5 to execute exhaust gas recirculation (step 50), and the intake flow rate Q is detected by the flow rate sensor 29 disposed at the intake port 11 of each cylinder at that time (step 51). The detection signal or the electrical signal is inputted to the controller 15. The comparison means of the controller 15 compares the electrical signal corresponding to the intake flow rate $Q_1$ with the electrical signal corresponding to the intake flow rate Q, and the calculation means of the controller 15 calculates the difference of their intake flow rates, that is, $Q_1 - Q$, and calculates the exhaust gas recirculation flow rate $m_{EGR}$ introduced into the combustion chamber 8 by exhaust gas recirculation, from the difference value. The accurate value of the exhaust gas recirculation flow rate $m_{EGR}$ can be detected by repetition of such determination cycles.

In the exhaust gas recirculation apparatus of an engine in accordance with the present invention, the operational condition of the exhaust valve 2 is controlled in response to the exhaust gas recirculation flow rate $m_{EGR}$ detected in the manner described above so that the optimum exhaust gas recirculation flow rate $Q_o$ can be maintained for the engine. In other words, in the exhaust gas recirculation apparatus of an engine, the electromagnetic valve driving device actuates each of the intake and exhaust valves 1, 2 for opening and closing by the electromagnetic force, the electrical signal of the optimum exhaust gas recirculation flow rate corresponding to the detection signal of the first detection means for detecting the operational condition of the engine and the electrical signal of the exhaust gas recirculation flow rate detected by the exhaust gas recirculation apparatus described above, that is, the second detection means, are inputted to the controller 15, and the controller 15 compares the detection values corresponding to both of these detection signals and regulates the valve operational conditions such as the valve lift quantity, valve timing, etc, of the exhaust valve 2, that is, the exhaust gas recirculation operational condition, in response to the difference obtained by comparison.

First of all, the engine is actuated (step 40) and whether or not the exhaust gas recirculation system, i.e. EGR, is to be executed during the driving of the engine is judged (step 41). If the exhaust gas recirculation operation is not at all executed at this time in the operation cycle of the engine, the intake and exhaust valves 1 and 2 are caused to conduct the normal valve motion and the engine operation not executing the exhaust gas recirculation is carried out (step 55). If, after the passage of a predetermined period of time (step 56), the driving of the engine is continued (step 57), the processing returns to the step 41.

If the exhaust gas recirculation operation is executed for the engine, the exhaust valve 2 is actuated for opening and closing by the valve lifter 10 of the electromagnetic valve driving device for the purpose of the exhaust gas recirculation operation (step 42). After the passage of a predetermined period of time (step 43), the exhaust gas recirculation flow rate $m_{EGR}$ introduced into the combustion chamber 8 is detected in the exhaust gas recirculation system where the engine is driven, and if the detected exhaust gas recirculation flow rate $m_{EGR}$ is not the optimum exhaust gas recirculation flow rate, whether or not the exhaust gas recirculation flow rate $m_{EGR}$ should be regulated by regulating the operational condition such as the valve lift quantity of the exhaust valve 2 is judged (step 44). If detection and regulation of the exhaust gas recirculation flow rate are judged as unnecessary at the step 44, the exhaust gas recirculation is continued under the present state (step 59), whether or not the driving of the engine should be continued is judged (step 60) and if it should be done, the processing returns to the step 41.

When detection and regulation of the exhaust gas recirculation flow rate are to be made at the step 44, the number of revolution of engine is detected by the rotation sensor 14 (step 45), the load of the engine is detected by the engine load sensor 31 (step 46) and the stroke position of the piston 7 or the crank angle is detected by the position sensor 35 (step 47).

Then, whether the exhaust gas recirculation should be executed or stopped for the engine is judged in order to detect the exhaust gas recirculation flow rate in the exhaust gas recirculation flow rate detection system described above (step 48). When the exhaust gas recirculation is stopped for a predetermined cycle such as one cycle, or for a predetermined cylinder 5, the opening/closing operation of the exhaust valve 2 for the exhaust gas recirculation is stopped but the exhaust valve 2 is caused to make the normal valve operation (step 61). Then, the intake flow rate $Q_1$ sucked into the combustion chamber 8 from the intake port 11 by the flow rate sensor 29 disposed at the intake port 11 of the cylinder whose opening/closing operation for the exhaust gas recirculation is stopped is detected (step 62). When the exhaust gas recirculation is executed for the engine, the exhaust valve 2 is caused to execute the opening/closing operation for the exhaust gas recirculation (step 49). Then, the intake flow rate Q sucked into the combustion chamber 8 is detected by the flow rate sensor 29 disposed at the intake port 11 of the cylinder whose exhaust valve 2 has executed the exhaust gas recirculation (step 50).

Next, the comparator of the controller 15 compares the intake flow rate Q when the exhaust gas recirculation is made with the intake flow rate $Q_1$ when the exhaust gas recirculation is stopped, and the accurate exhaust gas recirculation flow rate $m_{EGR}$ at the present operation time of the engine is detected from their difference by the exhaust gas recirculation flow rate detection system described above. If the exhaust gas recirculation flow rate $m_{EGR}$ is detected, the optimum exhaust gas recirculation flow rate $M_{EGR}$ is determined and set in advance because the operational conditions of the engine such as the number of revolution and engine load are detected by the sensors, so that the intake flow rate $Q_o$ corresponding to the optimum exhaust gas recirculation flow rate $M_{EGR}$ can be determined immediately from the operation conditions of the engine described above (step 51).

Next, the comparison of the intake flow rate $Q_o$ corresponding to the optimum exhaust gas recirculation flow rate $M_{EGR}$ with the intake flow rate Q when the exhaust gas recirculation is executed is equivalent to the comparison of the optimum exhaust gas recirculation flow rate $M_{EGR}$ with the exhaust gas recirculation flow rate $m_{EGR}$ at the present operation time and if there is any difference between them, the operational condition of the exhaust valve 2 may be regulated in order to bring the exhaust gas recirculation flow rate $m_{EGR}$ close to the optimum exhaust gas recirculation flow rate $M_{EGR}$ or in other words, to set the intake flow rate Q when the exhaust gas recirculation is made for the engine to the intake flow rate $Q_o$. Therefore, which relation the intake flow rate Q and the intake flow rate $Q_o$ have is judged or in other words, whether or not the relation $Q \geq Q_o$ exists is judged (step 52).

First, if the intake flow rate Q and the intake flow rate $Q_o$ are substantially equal to each other ($Q = Q_o$), the exhaust gas recirculation flow rate $m_{EGR}$ under the present operational condition of the engine is the optimumexhaust gas recirculation flow rate $M_{EGR}$; hence, the opening and closing operation of the exhaust valve under such a state may be maintained. Therefore, the processing returns to the step 41 and the processing system may be repeated.

If the intake flow rate Q is greater than the intake flow rate $Q_o$ ($Q > Q_o$), the exhaust gas recirculation flow rate $m_{EGR}$ is smaller than the optimum exhaust gas recirculation flow rate $M_{EGR}$. Therefore, in order to increase the exhaust gas recirculation flow rate $m_{EGR}$, regulation is made so as to increase the valve lift quantity and valve opening time of the exhaust valve 2 (step 53). When the exhaust gas recirculaition cycle is continued, the processing returns to the step 44 and the exhaust gas recirculation cycle may be repeated (step 54). If the cycle of the exhaust gas recirculation is not continued, the processing returns to the step 41 and the driving condition of the engine may be repeated (step 54).

Further, if the intake flow rate Q is smaller than the intake flow rate $Q_o$ ($Q < Q_o$), the exhaust gas recirculation flow rate $m_{EGR}$ is greater than the optimum exhaust gas recirculation flow rate $M_{EGR}$. Therefore, adjustment is made in the direction where the valve lift quantity and valve opening time of the exhaust valve 2 are decreased in order to reduce the exhaust gas recirculation flow rate $m_{EGR}$ (step 63). If the cycle of the exhaust gas recirculation is continued, the processing returns to the step 44 and the exhaust gas recirculation cycle may be repeated (step 64). If the cycle of the exhaust gas recirculation is not continued, the processing returns to the step 41 and the driving condition of the engine may be repeated (step 54).

What is claimed is:

1. An exhaust gas recirculation system of an engine, comprising:
   a cylinder block;
   cylinders formed in said cylinder block;
   a cylinder head fixed to said cylinder block;
   combustion chambers defined by said cylinder head and said cylinders;
   intake ports and exhaust ports formed in said cylinder head;
   intake valves opening and closing for introducing intake air into said combustion chambers, each being disposed at each of said intake ports;
   exhaust valves opening and closing either for exhausting a combustion gas of said combustion chambers from said combustion chambers to said exhaust ports or for introducing the exhaust gas from said exhaust ports into said combustion chambers, each being disposed at each of said exhaust ports;

electromagnetic valve driving devices for actuating said intake valves and said exhaust valves for opening and closing by electromagnetic force, respectively;

detection means each for detecting an intake flow rate flowing into each of said combustion chambers through each of said intake ports; and a controller for actuating each of said electromagnetic valve driving devices to open and close each of said intake valves and said exhaust valves, detecting the intake flow rate under the state where exhaust gas recirculation is made and the intake flow rate under the state where exhaust gas recirculation is stopped, by said detection means, and comparing the detection signals of said intake flow rates so as to detect an exhaust gas recirculation flow rate.

2. An exhaust gas recirculation system to an engine according to claim 1, wherein a detection signal obtained by making exhaust gas recirculation for any of said cylinders and detecting the intake flow rate of said cylinder is compared with a detection signal obtained by stopping the cycle of exhaust gas recirculation for said cylinder and detecting the intake flow rate of said cylinder in order to detect the exhaust gas flow rate supplied to said cylinder.

3. An exhaust gas recirculation system of an engine according to claim 1, wherein a detection signal obtained by making exhaust gas recirculation for any of said cylinders and detecting the intake flow rate of each of said cylinder is compared with a detection signal obtained by stopping the cycle of exhaust gas recirculation for each of said cylinders and detecting the intake flow rate of each of said cylinders in order to detect the exhaust gas recirculation flow rate.

4. An exhaust gas recirculation system of an engine according to claim 1, wherein said intake valves and said exhaust valves are made of a non-magnetic ceramic material.

5. An exhaust gas recirculation system of an engine according to claim 1, wherein each of said electromagnetic valve driving devices includes a movable element made of a magnetic material and fixed to the upper end of each of said intake valves and said exhaust valves, a movable element coil for actuating said movable element, a stationary element made of a magnetic material and disposed above said movable element in such a manner as to face said movable element, a stationary element coil for actuating said stationary element, and a valve spring for returning said movable element.

6. An exhaust gas recirculation system of an engine, comprising:

a cylinder block;

cylinders formed in said cylinder block;

a cylinder head fixed to said cylinder block;

combustion chambers defined by said cylinder head and said cylinders;

intake ports and exhaust ports formed in said cylinder head;

intake valves opening and closing for introducing intake air into said combustion chambers, each being disposed at each of said intake ports;

exhaust valves opening and closing either for exhausting a combustion gas of said combustion chambers from said combustion chambers to said exhaust ports or for introducing the exhaust gas from said exhaust ports into said combustion chambers, each being disposed at each of said exhaust ports;

electromagnetic valve driving devices for actuating said intake valves and said exhaust valves for opening and closing by electromagnetic force, respectively;

intake flow rate detection means, each for detecting the intake flow rate flowing into each of said combustion chambers through each of said intake ports;

operational condition detection means for detecting the operational conditions of the engine; and a controller for actuating each of said electromagnetic valve driving devices to open and close each of said intake valves and said exhaust valves, detecting the intake flow rate under the state where exhaust gas recirculation is made and the intake flow rate under the state where the exhaust gas recirculation is stopped, by said detection means, comparing the detection signals of said intake flow rate so as to detect an exhaust gas recirculation flow rate, and controlling the operational condition of said exhaust valve so that said exhaust gas recirculation flow rate becomes an optimum exhaust gas recirculation flow rate, in response to the difference between said detected exhaust gas recirculation flow rate and said optimum exhaust gas recirculation flow rate set in advance in such a manner as to correspond to the engine operational condition detected by said operational condition detection means.

7. An exhaust gas recirculation system of an engine according to claim 6, wherein said operational condition detection means is a load sensor for detecting the load of the engine.

8. An exhaust gas recirculation system of an engine according to claim 6, wherein said operational condition detection means is a rotation sensor for detecting the number of revolution of the engine.

9. An exhaust gas recirculation system of an engine according to claim 6, wherein said controller makes control so that the valve lift quantity and valve opening time of each of said exhaust valves becomes small, in response to the detection signal representing that said detected exhaust gas recirculation flow rate is greater than said optimum exhaust gas recirculation flow rate.

10. An exhaust gas recirculation system of an engine according to claim 6, wherein said controller makes control so that the valve lift quantity and valve opening time of each of said exhaust valves become great, in response to the detection signal representing that said detected exhaust gas recirculation flow rate is smaller than said optimum exhaust gas recirculation flow rate.

* * * * *